(12) United States Patent
Mizusawa et al.

(10) Patent No.: US 12,470,663 B2
(45) Date of Patent: Nov. 11, 2025

(54) INFORMATION PROCESSING APPARATUS, INFORMATION PROCESSING METHOD, AND INFORMATION PROCESSING SYSTEM

(71) Applicant: SEIKO EPSON CORPORATION, Tokyo (JP)

(72) Inventors: Nobutada Mizusawa, Sapporo (JP); Katsuya Tanaka, Sapporo (JP)

(73) Assignee: SEIKO EPSON CORPORATIOIN, Tokyo (JP)

( * ) Notice: Subject to any disclaimer, the term of this patent is extended or adjusted under 35 U.S.C. 154(b) by 200 days.

(21) Appl. No.: 18/240,569

(22) Filed: Aug. 31, 2023

(65) Prior Publication Data

US 2024/0073350 A1     Feb. 29, 2024

(30) Foreign Application Priority Data

Aug. 31, 2022 (JP) .................................. 2022-137377

(51) Int. Cl.
*H04N 1/60* (2006.01)
*G06K 7/14* (2006.01)

(52) U.S. Cl.
CPC ......... *H04N 1/6052* (2013.01); *G06K 7/1417* (2013.01); *H04N 1/6033* (2013.01)

(58) Field of Classification Search
None
See application file for complete search history.

(56) References Cited

U.S. PATENT DOCUMENTS

| 12,034,893 | B2* | 7/2024 | Maruyama | H04N 1/00328 |
| 12,105,994 | B2* | 10/2024 | Sako | G06F 3/1286 |
| 2002/0118210 | A1* | 8/2002 | Yuasa | H04N 1/6052 |
| | | | | 345/589 |
| 2012/0075645 | A1* | 3/2012 | Katayama | H04N 1/6055 |
| | | | | 358/1.9 |
| 2012/0081722 | A1* | 4/2012 | Katayama | G06K 15/1878 |
| | | | | 358/1.9 |
| 2020/0336622 | A1* | 10/2020 | Kunimi | H04N 1/6027 |
| 2022/0131982 | A1* | 4/2022 | Kihara | H04N 1/00013 |
| 2022/0141356 | A1* | 5/2022 | Kihara | H04N 1/6072 |
| | | | | 358/1.9 |
| 2023/0269343 | A1* | 8/2023 | Nakashio | G06F 3/1237 |
| | | | | 358/1.9 |

FOREIGN PATENT DOCUMENTS

| CA | 2360989 C | * | 1/2009 | ........... H04N 1/6033 |
| EP | 1206122 A1 | * | 5/2002 | ........... H04N 1/6033 |
| JP | 2020072280 A | * | 5/2020 | |
| JP | 2023122718 A | * | 9/2023 | ........... H04N 1/6044 |

* cited by examiner

*Primary Examiner* — Ted W Barnes
(74) *Attorney, Agent, or Firm* — CHIP LAW GROUP

(57) ABSTRACT

An information processing apparatus including: a code reader configured to read a two-dimensional code including processing information indicating processing regarding a sample color; a selection section configured to select first processing or second processing regarding the sample color based on the processing information; and a screen controller configured to display a first screen for displaying information regarding the first processing or a second screen for displaying information regarding the second processing in accordance with a result selected by the selection section.

9 Claims, 11 Drawing Sheets

FIG. 6

| PROCESSING INFORMATION | | |
|---|---|---|
| PROCESSING TYPE | 1: SPECIFICATION OF SAMPLE COLOR<br>2: COLOR MATCHING ON SAMPLE COLOR | |
| COLOR MEASUREMENT CONDITIONS | M FACTOR<br>LIGHT SOURCE<br>VIEWING ANGLE | |
| SAMPLE COLOR | SAMPLE COLOR 1 | ID |
| | | NAME |
| | | DISPLAY COLOR |
| | ⋮ | |
| | SAMPLE COLOR n | ID |
| | | NAME |
| | | DISPLAY COLOR |
| PATCH | PATCH 1 | DISPLAY COLOR |
| | ⋮ | |
| | PATCH N | DISPLAY COLOR |

INFORMATION PROCESSING APPARATUS, INFORMATION PROCESSING METHOD, AND INFORMATION PROCESSING SYSTEM

The present application is based on, and claims priority from JP Application Serial Number 2022-137377, filed Aug. 31, 2022, the disclosure of which is hereby incorporated by reference herein in its entirety.

BACKGROUND

1. Technical Field

The present disclosure relates to an information processing apparatus, an information processing method, and an information processing system.

2. Related Art

Techniques for printing a specific part of printed matter in a specific color are known. For example, JP-A-2020-72280 discloses a technique for printing a specified color by a printer and then making corrections by comparison using a color measurement result produced by a colorimeter.

A computer is often used when performing processing such as color matching or the like with color measurement of a sample color. However, when a plurality of kinds of processing is performed on a sample color by using a single computer, and a user has to select processing to start the processing by himself or herself, the operation becomes complicated.

SUMMARY

According to an aspect of the present disclosure, there is provided an information processing apparatus including: a code reader configured to read a two-dimensional code including processing information indicating processing regarding a sample color; a selection section configured to select first processing or second processing regarding the sample color based on the processing information; and a screen controller configured to display a first screen for displaying information regarding the first processing or a second screen for displaying information regarding the second processing in accordance with a result selected by the selection section.

According to another aspect of the present disclosure, there is provided an information processing method including: reading a two-dimensional code including processing information indicating processing regarding a sample color; selecting first processing or second processing regarding the sample color based on the processing information; and displaying a first screen for displaying information regarding the first processing or a second screen for displaying information regarding the second processing in accordance with a selected result.

According to still another aspect of the present disclosure, there is provided an information processing system including a server and an information processing apparatus, the information processing apparatus including: a code reader that reads a first two-dimensional code displayed on a display device by an instruction from the server or a second two-dimensional code printed using a printer by an instruction from the server, the first two-dimensional code or the second two-dimensional code including processing information indicating processing regarding a sample color; a selection section that selects first processing or second processing regarding the sample color based on the processing information; a screen controller that displays a first screen for displaying information regarding the first processing or a second screen for displaying information regarding the second processing in accordance with a result selected by the selection section; and a transmission section that transmits information obtained by the first processing or the second processing to the server, the server including a storage medium for storing the information obtained by the first processing or the second processing.

BRIEF DESCRIPTION OF THE DRAWINGS

FIG. 6 is a diagram illustrating an example of processing information.

DESCRIPTION OF EMBODIMENTS

Here, a description will be given of embodiments of the present disclosure in accordance with the following order.
1. System Configuration
   1.1 Server Configuration
   1.2 Terminal Configuration
   1.3 Information Processing Apparatus Configuration
   1.4 Printer Configuration
2. Sample Color Processing
   2.1 Specification Processing of Sample Color
   2.2 Color Matching Processing on Sample Color
3. The Other Embodiments

1. System Configuration

Figure 1:
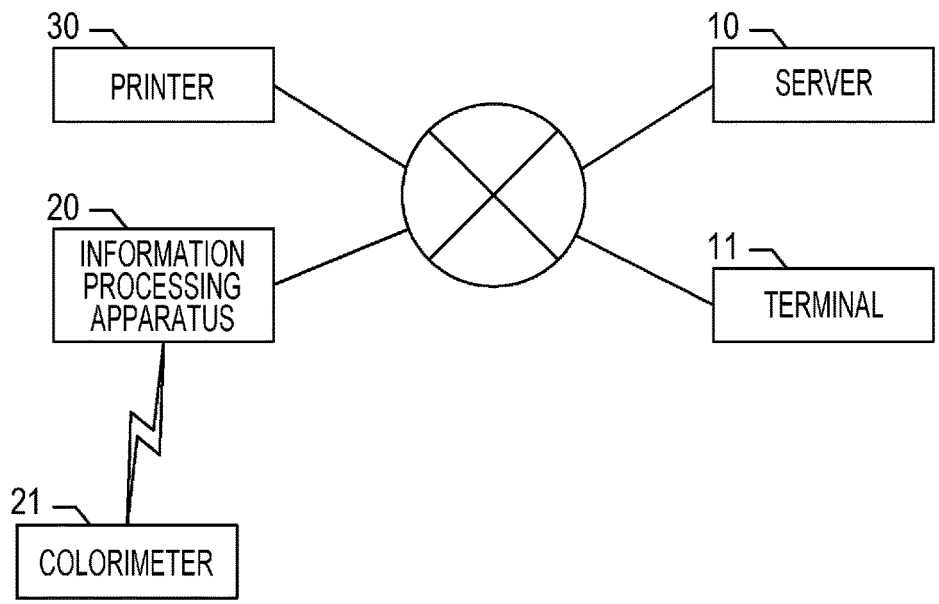
FIG. 1 is a diagram schematically illustrating an example of an information processing system.

FIG. 1 is a diagram schematically illustrating an example of an information processing system according to an embodiment of the present disclosure. The information processing system 1 includes a server 10, a terminal 11, an information processing apparatus 20, a colorimeter 21, and a printer 30. In the present embodiment, the number of devices illustrated in FIG. 1 is an example, and the number is not limited. For example, the plural information processing apparatuses 20, the printers 30 and the like may be used. The server 10, the terminal 11, the information processing apparatus 20, and the printer 30 are able to communicate with each other via a network. Various modes may be used for the network. In the example illustrated in FIG. 1, the internet is assumed, but a local network may be used.

A user of the present embodiment is able to print various kinds of printed matter using the printer 30. The user is able to make an adjustment at the time of printing so as to print printed matter in a desired color by using the printer 30. The user is able to print printed matter including the same color as a sample color determined to be a specific color by the printer 30 by using the adjustment function.

The user specifies a sample color for making this adjustment. The specification of a sample color is the processing for specifying what color is the sample color, that is to say, the processing for specifying color measurement values of the sample color. In this specification, the processing for specifying color measurement values of the sample color is sometimes referred to as processing for specifying the sample color. In the present embodiment, a sample color is specified by Lab values (CIELAB values), which are coordinate values in a machine independent color space. Also, in the present embodiment, a sample color is indicated by a sample. That is to say, the user provides a sample indicating a sample color. The user then specifies Lab values obtained by measuring the color of the sample by using the colorimeter 21 as sample color values.

In the printer 30, it is possible to reproduce a color assumed as an output result in accordance with print data to some extent by performing printing using a color profile. However, a color that is different from the assumed color is sometimes printed due to an individual difference of the printer and a change over time. Thus, in the present embodiment, the user is able to perform matching processing between a color specified as a sample color and a color obtained by printing the sample color using the printer 30. That is to say, the user performs processing for color matching on a sample color printed by the printer 30. At this time, the user causes the printer 30 to print a patch based on the print data for printing the sample color, and identifies Lab values by measuring the color of the patch by using the colorimeter 21. The patch may have Lab values different from the Lab values specified as the sample color due to an individual difference and a change over time. It is thus possible to make corrections of the Lab values specified as the sample color by comparing the Lab values specified as the sample color and the Lab values of the patch actually printed based on the print data for printing the sample color.

In the following, a description will be given of the configuration of each device of the information processing system 1 configured to perform the sample color processing described above.

1.1 Server Configuration

Figure 2:
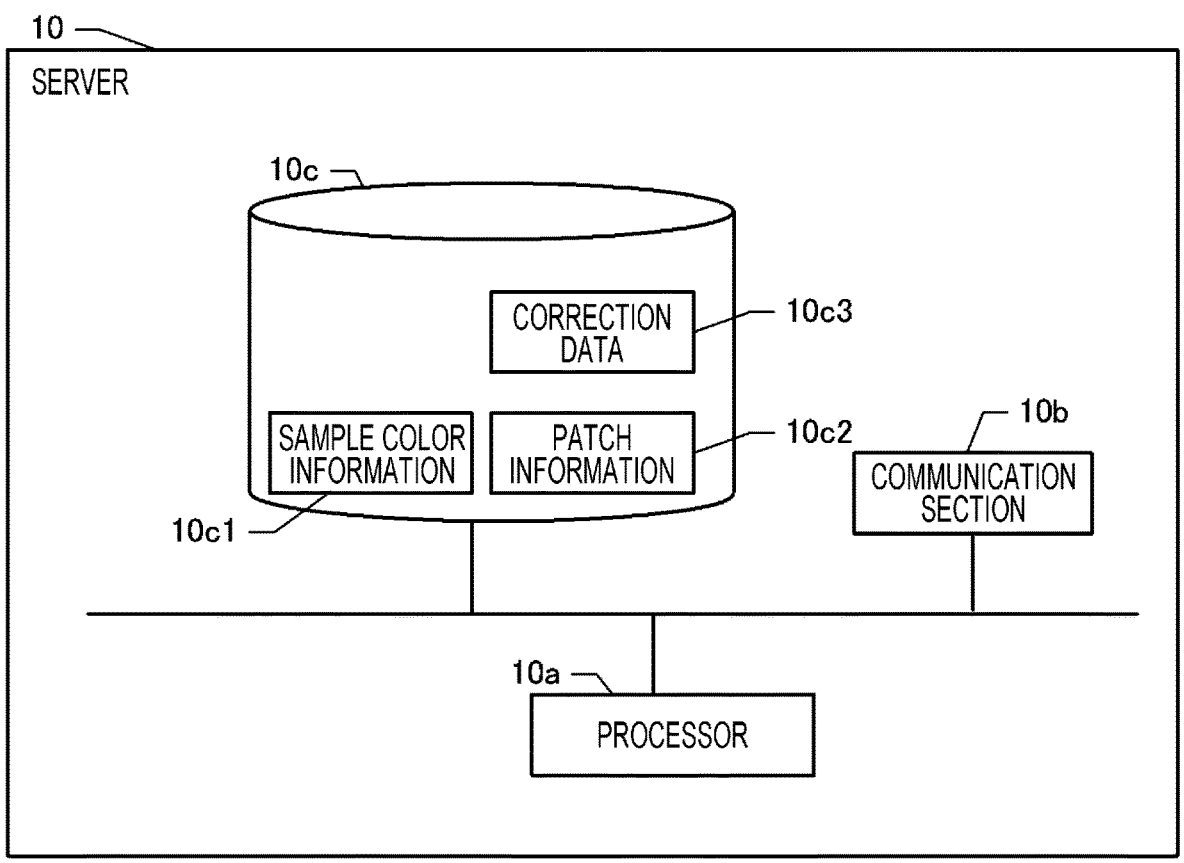
FIG. 2 is a block diagram illustrating the configuration of a server.

FIG. 2 is a block diagram illustrating the configuration of the server 10. The server 10 includes a processor 10a, a communication section 10b, and a nonvolatile memory 10c. The processor 10a includes a CPU, a ROM, a RAM, and the like that are not illustrated in FIG. 2, and is able to execute various programs recorded in the nonvolatile memory 10c so as to control each section of the server 10 and each device coupled to the network. In this regard, the processor 10a may be configured by a single chip, by multiple chips, or as a SoC with various functional blocks for operating the printer. Also, for example, an ASIC may be employed instead of the CPU, or the CPU and an ASIC may work in combination. When each device according to the present embodiment includes a processor, the processor is able to be realized in various modes in the same manner as the processor 10a.

The communication section 10b includes a communication interface for communicating with an external device in accordance with various wired or wireless communication protocols. The server 10 is able to communicate with another device via the communication section 10b. In this regard, the communication section 10b may include an interface for communicating with various removable memories mounted on the server 10.

The nonvolatile memory 10c of the server 10 stores various kinds of information. For example, the nonvolatile memory 10c stores sample color information 10c1 regarding a sample color, patch information 10c2 regarding a patch, and correction data 10c3 for making necessary corrections for printing the sample color.

The sample color information 10c1 is information that associates the identification information of a sample color with Lab values. The sample color information 10c1 is created by associating the identification information for identifying the color of a sample with Lab values as a result of color measurement when the color of a sample is measured by specification processing of a sample color. In the present embodiment, the identification information is an ID number and a name. However, for the identification information, various kinds of information may be employed.

The patch information 10c2 is information that associates the identification information of a patch with Lab values. The patch information 10c2 is created by associating the identification information for identifying a patch with Lab values as a result of color measurement when the color of a patch is measured by color matching processing on a sample color. In the present embodiment, the color of a patch is measured for color matching on a sample color, and a certain patch is associated with a corresponding sample color. Thus, in the present embodiment, the identification information of a patch is the same as the identification information of the sample color.

The correction data 10c3 only needs to be data for correcting a color to be output by the printer 30 when printing is performed by specifying a sample color, and may be defined in various modes. In the present embodiment, it is possible to specify a sample color by Lab values, and the printer 30 converts the Lab values into values indicating ink for each ink color based on a color profile. The correction data 10c3 is the data for correcting the conversion using the color profile. The correction data 10c3 may be created in various methods. When a patch printed by the printer 30 has specific Lab values based on the Lab values of a sample color, correction data for correcting the Lab values of the patch to match the Lab values of the sample color is identified, for example, by publicly known technology. The correction data 10c3 may be correction data obtained in this manner.

1.2 Terminal Configuration

Figure 3:
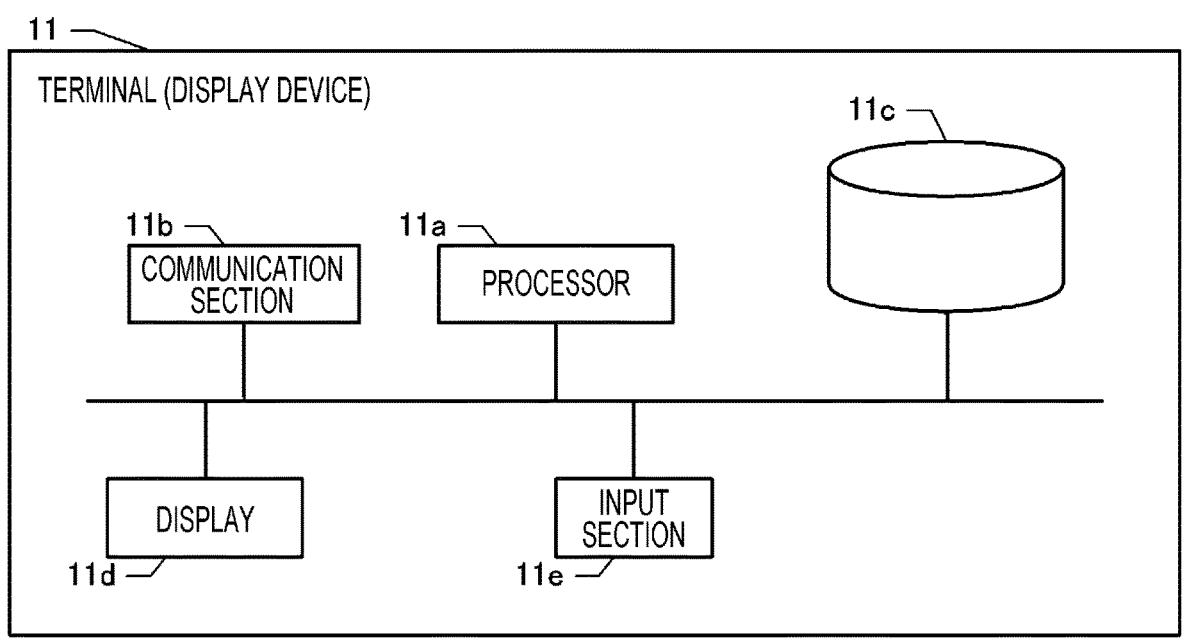
FIG. 3 is a block diagram illustrating the configuration of a terminal.

FIG. 3 is a block diagram illustrating the configuration of the terminal 11. The terminal 11 includes a processor 11a, a communication section 11b, a nonvolatile memory 11c, a display 11d, and an input section 11e. The processor 11a includes a CPU, a ROM, a RAM, and the like not illustrated in FIG. 3, and is able to execute various programs recorded in the nonvolatile memory 11c to control each section of the terminal 11.

The communication section 11b includes a communication interface for communicating with an external device in accordance with various wired or wireless communication protocols. The terminal 11 is able to communicate with another device via the communication section 11b. Also, the communication section 11b includes an interface for communicating with various removable memories mounted on the terminal 11.

The nonvolatile memory 11c of the terminal 11 saves various programs, data used for executing the programs, and the like. The display 11d is a display device for displaying any image. The input section 11e is a device for a user to perform an input operation and includes, for example, a keyboard, a mouse, a touch panel, and the like. It is possible for a user to input a user intention by operating the input section 11e while viewing an image or a character displayed on the display 11d.

In the present embodiment, the user is able to instruct the processor 11a to execute a predetermined program, for example, a browser or the like so as to cause the server 10 to execute various kinds of processing by using the display 11d and the input section 11e as user interfaces.

1.3 Configuration of Information Processing Apparatus

Figure 4:
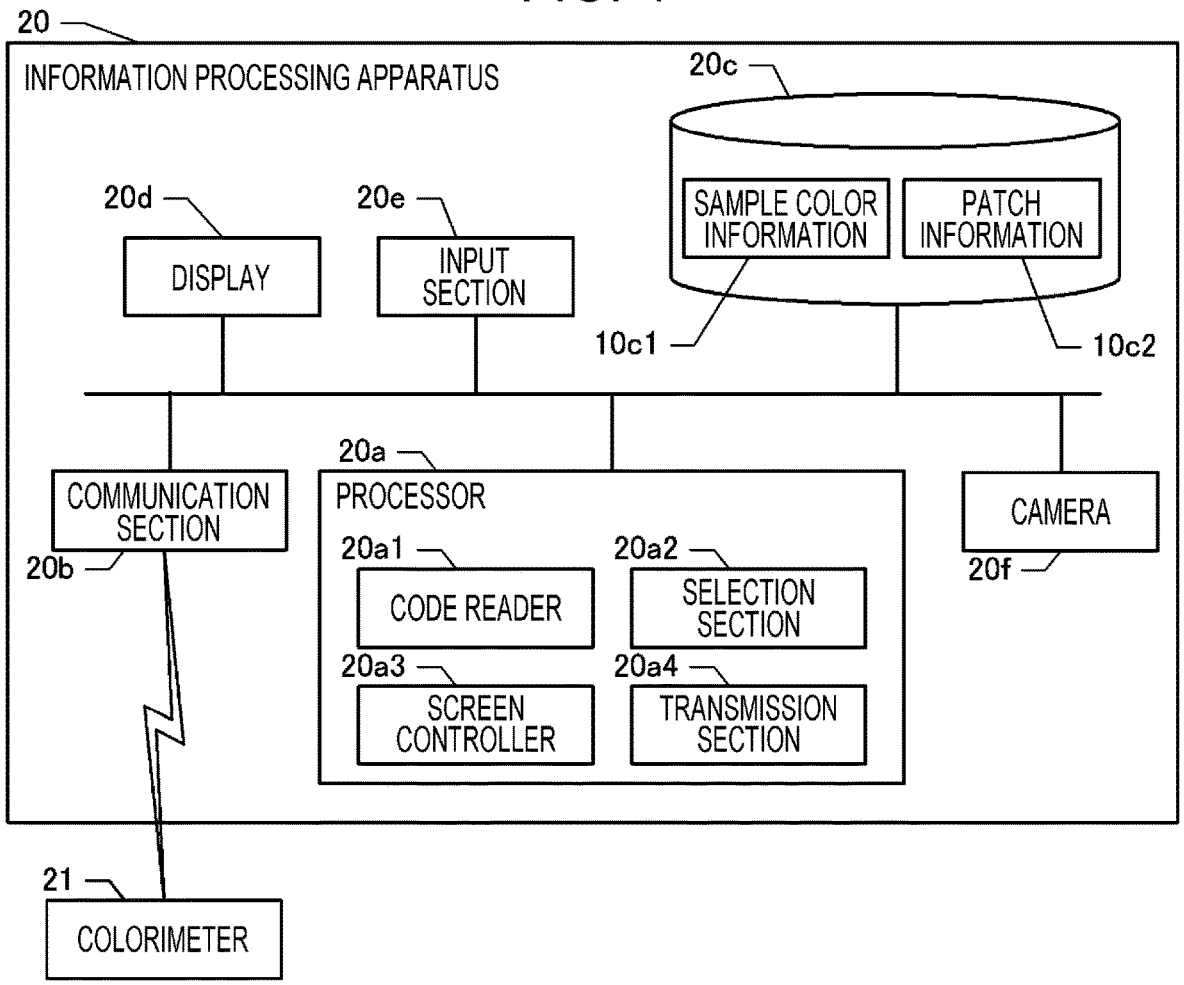
FIG. 4 is a block diagram illustrating the configuration of an information processing apparatus.

FIG. 4 is a block diagram illustrating the configuration of the information processing apparatus 20. The information processing apparatus 20 includes a processor 20a, a communication section 20b, a nonvolatile memory 20c, a display 20d, an input section 20e, and a camera 20f. In the present embodiment, the information processing apparatus 20 is a mobile terminal.

The communication section 20b includes a communication interface for communicating with an external device in accordance with various wired or wireless communication protocols. The information processing apparatus 20 is able to communicate with another device via the communication section 20b to transmit and receive any information. In the present embodiment, the communication section 20b includes a communication interface for performing short-range wireless communication, and is able to communicate with the colorimeter 21 in accordance with a predetermined standard (for example, Bluetooth (registered trademark)).

The nonvolatile memory 20c is able to save various kinds of information. In the present embodiment, the nonvolatile memory 20c is able to save the sample color information 10c1 including Lab values obtained from the colorimeter 21 and the patch information 10c2. The display 20d is a display section that displays various kinds of information. The input section 20e is a device, such as a mouse, a keyboard, or the like, and is able to receive various kinds of input by a user.

The camera 20f includes an imaging optical system and an imaging device, captures the image of an object in the field of view of the imaging optical system, and outputs image data. The processor 20a is able to perform various kinds of processing based on the image data.

The processor 20a includes a CPU, a ROM, a RAM, and the like that are not illustrated in FIG. 4, and are able to execute the various programs recorded in the nonvolatile memory 20c to control each section of the information processing apparatus 20. In the present embodiment, the processor 20a executes an information processing program not illustrated in FIG. 4 so as to function as a code reader 20a1, a selection section 20a2, a screen controller 20a3, and a transmission section 20a4.

The code reader 20a1 has a function to read a two-dimensional code including the processing information indicating the processing regarding a sample color. The selection section 20a2 has a function to select the first processing or the second processing regarding the sample color based on the processing information. The screen controller 20a3 has a function to display a first screen that displays information regarding the first processing or a second screen that displays information regarding the second processing in accordance with a result selected by the selection section. The transmission section 20a4 has a function to transmit information obtained by the first processing or the second processing to the server. In this regard, in the present embodiment, the first processing is the processing that specifies color measurement values (Lab values) of a sample color, and the second processing is the processing that performs color matching on a sample color printed by the printer 30. A detailed description will be given of each function performed by the processor 20a.

1.4 Printer Configuration

Figure 5:
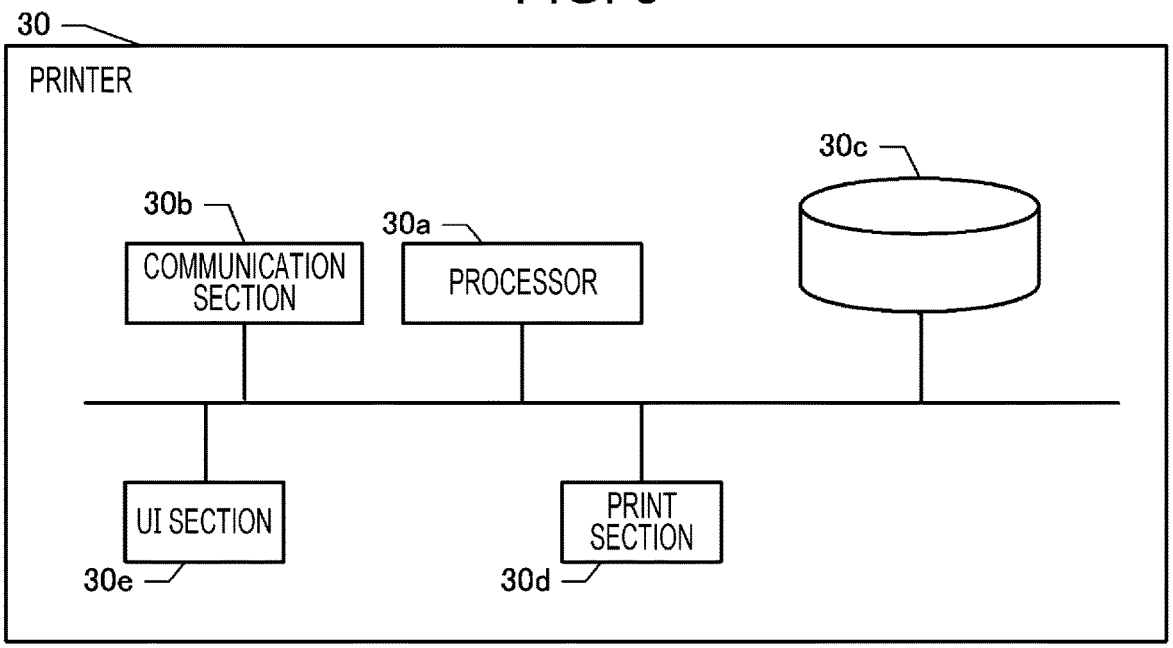
FIG. 5 is a block diagram illustrating the configuration of a printer.

FIG. 5 is a block diagram illustrating the configuration of the printer 30. The printer 30 includes a processor 30a, a communication section 30b, a nonvolatile memory 30c, a print section 30d, and a UI section 30e. The processor 30a includes a CPU, a ROM, a RAM, and the like that are not illustrated in FIG. 5, and is able to execute various programs recorded in the nonvolatile memory 30c to control each section of the printer 30.

The communication section 30b includes a communication interface for communicating with an external device in accordance with various wired or wireless communication protocols. The printer 30 is able to communicate with another device via the communication section 30b. In this regard, the communication section 30b may include an interface for communicating with various removable memories mounted on the printer 30. The nonvolatile memory 30c is a memory that is able to save various data, and saves print data indicating a print target, and data to be used for printing, for example, a color profile and the like.

The print section 30d is a section that performs printing, and may employ various printing methods, such as an ink jet method, an electrophotographic method, or the like. The print section 30d includes an actuator and various devices for performing printing on various media, a sensor, a drive circuit, a machine part, and the like. The sensor includes a sensor that detects various detection targets that may change in the printer 30. The detection targets are not limited, and include, for example, a sensor that detects the remaining amount of a medium, a sensor that detects the remaining amount of ink for each color used for printing, and the like.

The UI section 30e includes a touch panel display, various keys, a switch, and the like. The touch panel display includes a display panel that displays various kinds of information, for example, the status of the printer 30, the remaining amount of ink, and the like, and a touch detection panel laminated on the display panel, and detects touch operation by a human finger or the like. The processor 30a is able to obtain the contents of a user operation via the UI section 30e. Also, the processor 30a is able to display various kinds of information on the display of the UI section 30e to notify a user.

In the present embodiment, the user is able to operate the terminal 11 or the like to save any print data in the server 10, and cause the printer 30 to perform printing based on the saved print data. When printing, the server 10 transmits print data to the printer 30, and the processor 30a obtains the print data from the server 10 via the communication section 30b. The processor 30a then performs image processing based on the print data using data, such as a color profile and the like so as to generate printable data. The processor 30a causes the print section 30d to perform printing based on the data.

When printed matter includes a sample color, the user is able to specify the sample color and perform color matching on the sample color, and then print the sample color on the printer 30. In the present embodiment, when printed matter includes a sample color, print data includes the Lab values of the sample color and information indicating a pixel to be printed in the sample color. Further, the print data is associated with correction data 10c3 for printing the sample color as a specified color, and is transmitted from the server 10.

When the processor 30a performs color conversion using a color profile, the processor 30a performs color conversion on the sample color based on the correction data 10c3 so as to identify information necessary for printing the sample color by the printer 30, for example, the amount of ink necessary at the time of printing the sample color. The processor 30a generates print executable data such that the data includes the information, and causes the print section 30d to perform printing. As a result, printed matter is produced such that the sample color has the specified Lab values.

2. Sample Color Processing

As described above, in the information processing system 1 according to the present embodiment, when the printer 30 prints a sample color, it is necessary to perform specification of the sample color and color matching on the sample color in advance. These processes need complex work, such as preparation of printed matter, use of a colorimeter, and the like, and thus the user workload is desirable to be as little as possible. Accordingly, in the present embodiment, the information processing apparatus 20 employs the configuration in which a suitable process is started without giving an instruction by the user as to either specification of a sample color or color matching on a sample color.

Specifically, the information processing apparatus 20 is configured to select either specification of a sample color or color matching on a sample color by reading a two-dimensional code. Accordingly, the processing information to be encoded as a two-dimensional code includes information indicating the processing to be selected after reading the two-dimensional code.

FIG. 6 illustrates an example of the processing information included in the two-dimensional code. In FIG. 6, an item of the processing information is illustrated on the left, and the contents of each item are illustrated on the right. As illustrated in FIG. 6, the processing information includes information indicating a processing type. The processing type indicates the processing on a sample color. In the present embodiment, when the processing type is 1, it is regarded that the specification processing of a sample color is to be selected, whereas when the processing type is 2, it is regarded that the color matching on a sample color is to be selected.

In the present embodiment, the processing information includes color measurement conditions. That is to say, the color measurement conditions to be applied in the colorimeter 21 are described as a two-dimensional code. The color measurement conditions may be defined by values for various items. In the example illustrated in FIG. 6, it is assumed that the color measurement conditions are defined by specifying an M factor, a light source, and a viewing angle.

In FIG. 6, the information indicated in the item of a sample color is the information used by the information processing apparatus 20 at the time of specifying a sample color. Specifically, an ID, which is identification information, and a name are defined for each sample color. With this configuration, it is possible to clearly distinguish a sample color to be measured by the identification information. Further, in the example illustrated in FIG. 6, a color to display when displaying the sample color on the display 20d of the information processing apparatus 20 is defined as a display color. That is to say, the display color is defined such that a color as close as possible to an actual sample color is displayed on the display 20d of the information processing apparatus 20 when an icon indicating a sample color is displayed. With this configuration, it is possible to display a sample color in a color as close as possible to the actual sample color on the display 20d. There may be a plurality of sample colors, and thus in FIG. 6, it is assumed that there are n (n is an integer of 2 or more) sample colors.

In FIG. 6, the information illustrated in the patch item is the information regarding a patch to be the target of the color matching. That is to say, a patch of the sample color is printed by the printer 30 in a state in which correction is not performed at the time of the color matching, and thus the processing information includes the information regarding the patch. In the present embodiment, the information regarding a patch is the information indicating a display color which is a color to display when displaying the patch on the display 20d of the information processing apparatus 20. Here, when an icon indicating a patch is displayed on the display 20d of the information processing apparatus 20, a display color is defined such that the color is displayed as close as possible to the color of the actual printed matter. There may be a plurality of patches, and thus there assumed to be N (N is an integer of 2 or more) patches in FIG. 6. In this regard, in the present embodiment, the color matching on a sample color is performed in a state in which a sample color to which the patch should correspond is grasped by the server 10, and thus the sample color is not included in the processing information. However, an ID and a name, which are the identification information, may also be included in the processing information for a patch. With the configuration described above, it is possible to display a patch in a color as close as possible to the color of the actual printed matter on the display 20d.

In the present embodiment, when the processing type is 1, that is to say, when the specification of a sample color is performed, a two-dimensional code, by which information on each item of the processing type, color measurement conditions, and a sample color are defined, is used. Here, the two-dimensional code to be used when a sample color is specified is also referred to as a first two-dimensional code. Also, when the processing type is 2, that is to say, when the color matching on a sample color is performed, a two-dimensional code by which information on each item of the processing type, color measurement conditions, and a patch are defined, is used. Here, the two-dimensional code to be used when the color matching on a sample color is performed is also referred to as a second two-dimensional code.

In the present embodiment, the specification of a sample color is started when a user operates the terminal 11 to give a start instruction of the specification of a sample color. At this time, the server 10 transmits data for displaying a first two-dimensional code to the terminal 11. The processor 11a of the terminal 11 receives the data via the communication section 11b and displays the first two-dimensional code on the display 11d. In this sense, in the present embodiment, the terminal 11 functions as a display device on which the first two-dimensional code is displayed by an instruction from the server 10.

On the other hand, in the present embodiment, the color matching on a sample color is started when a user operates the terminal 11 to give a start instruction of the color matching on a sample color. At this time, the server 10 transmits the data for printing a second two-dimensional code. The processor 30*a* of the printer 30 receives the data via the communication section 30*b* and causes the print section 30*d* to print the second two-dimensional code. In this sense, in the present embodiment, the printer 30 functions as a printer that prints the second two-dimensional code by an instruction from the server 10.

2.1 Specification Processing of Sample Color

Figure 7:
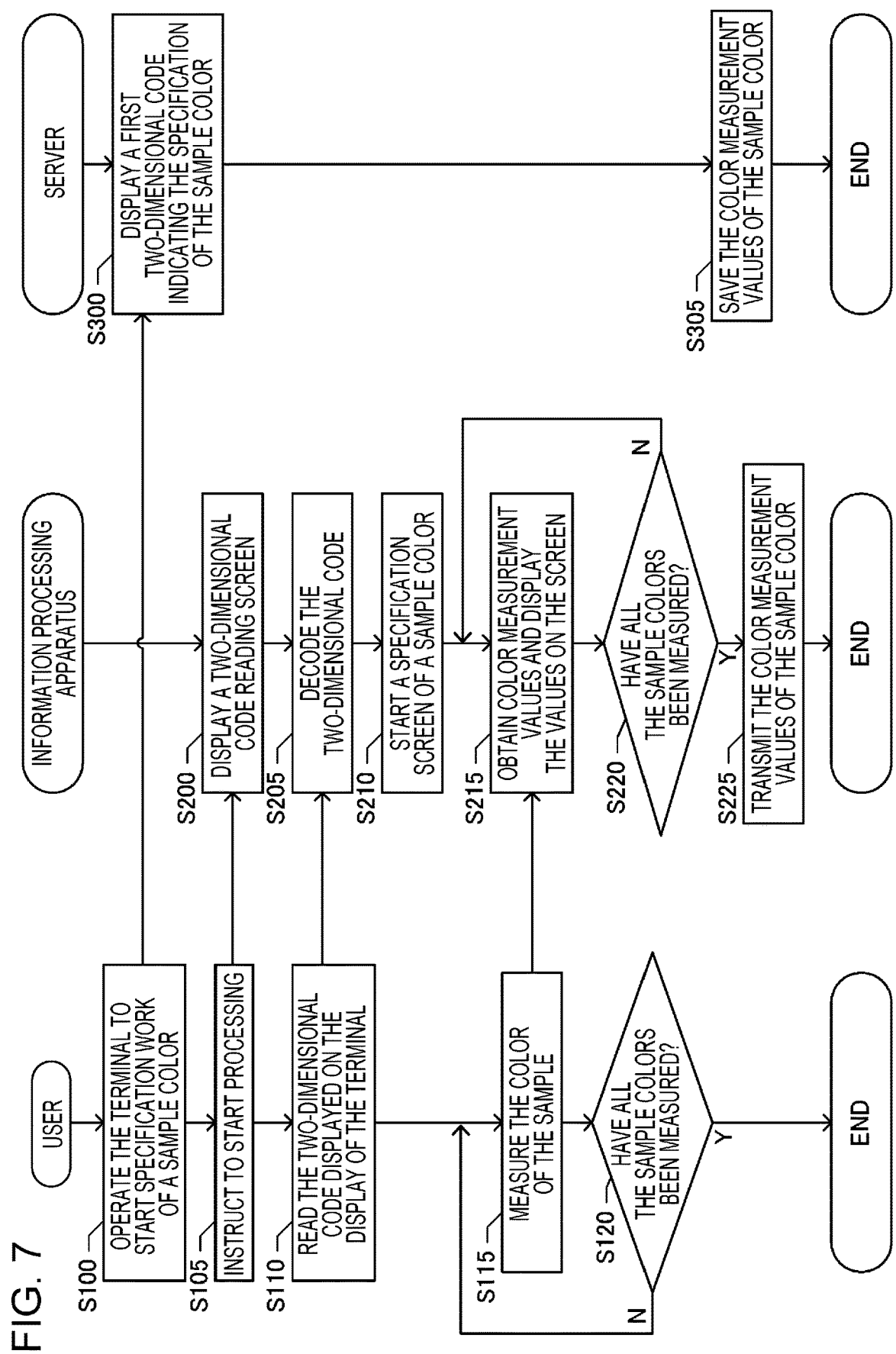
FIG. 7 is a flowchart illustrating the work and the processing regarding specification of a sample color.

In the following, a detailed description will be given of the specification processing of a sample color. The specification of the sample color is carried out by measuring the color of a sample prepared in advance, and specifying color measurement values (Lab values) of the sample. FIG. 7 is a flowchart illustrating the specification processing of a sample color, that is to say, the workflow of a user, the processing flow performed by the information processing apparatus 20, and the processing flow performed by the server 10. When starting specification processing of a sample color, the user first provides a sample printed in a sample color. In the present embodiment, the sample is a card type medium printed in a sample color, and the name of the sample color is written in association with the sample color.

When a sample is provided, the user starts specification work of the sample color (step S100). That is to say, the user operates the input section 11*e* of the terminal 11 to input a start instruction of the specification work of the sample color. At this time, the user operates the input section 11*e* to input the name of the sample color whose Lab values are to be specified. When there are a plurality of target sample colors, the user inputs the names of the individual sample colors. When the name is input, the processor 11*a* of the terminal 11 transmits the name of the sample color to the server 10 via the communication section 11*b*.

When the information is transmitted, the processor 10*a* of the server 10 displays a first two-dimensional code indicating the specification of the sample color (step S300). Specifically, the processor 10*a* obtains information indicating the name of each sample color via the communication section 10*b*, and associates an ID with each sample color. Further, the processor 11*a* associates a display color with each sample color. The display color may be determined by various methods, that is to say, the user may determine the color, or may be determined based on its name. It is possible to use the latter, for example, when the name of a sample is well known, and what color is known from its name.

Figure 8:
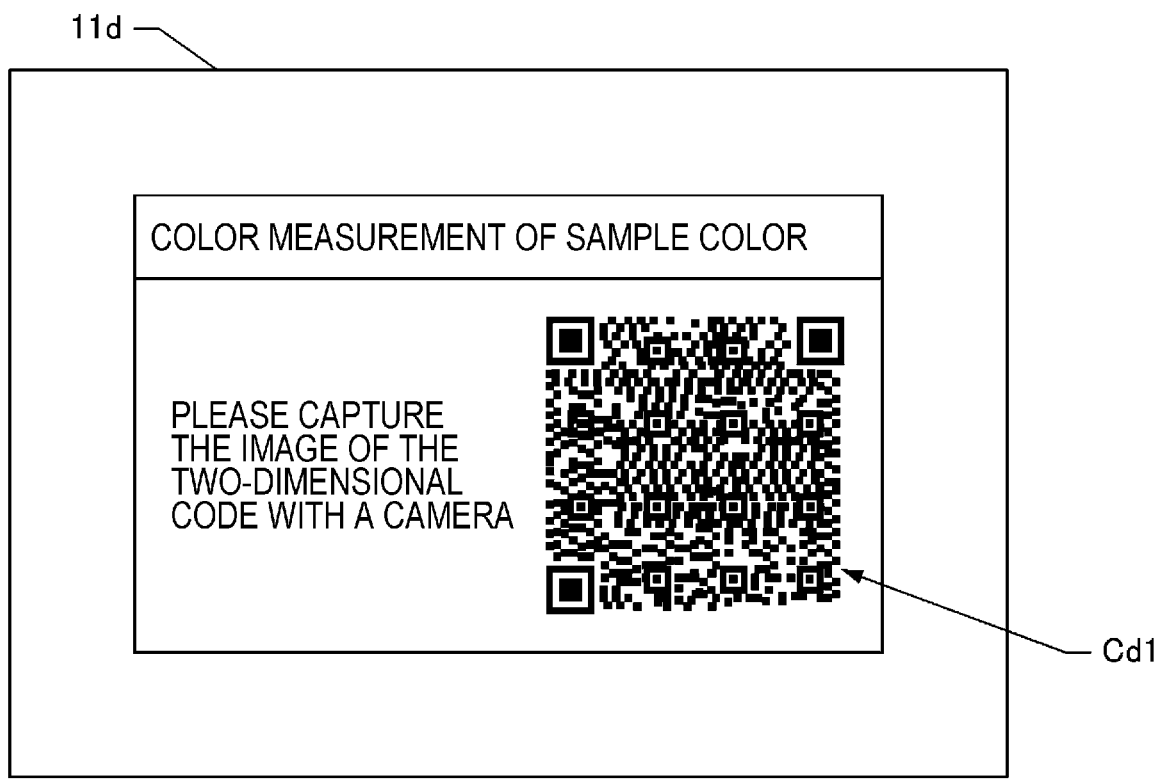
FIG. 8 is a diagram illustrating a display example of a first two-dimensional code.

When an ID, a name, and a display color are defined for each sample color, the processor 10*a* creates a first two-dimensional code that includes these pieces of information, color measurement conditions, and processing information indicating a processing type 1. The processor 10*a* then transmits the information indicating the first two-dimensional code to the terminal 11 via the communication section 10*b* to instruct to display the first two-dimensional code. When the terminal 11 receives the information, the processor 11*a* of the terminal 11 controls the display 11*d* to display the first two-dimensional code. FIG. 8 is a diagram illustrating a first two-dimensional code Cd1 displayed on the display 11*d*.

When the first two-dimensional code Cd1 is displayed on the display 11*d* of the terminal 11, the user gives a processing start instruction by using the information processing apparatus 20 (step S105). That is to say, the user operates the information processing apparatus 20 to start the information processing program. As a result, the processor 20*a* displays a processing start instruction button, which is not displayed in FIG. 2, on the display 20*d*. The user instructs the processing start by tapping operation on the processing start instruction button or the like. The processing start instruction button is a button that is common to the specification of a sample color and the color matching on a sample color. Accordingly, it is not necessary for the user to determine by himself or herself which processing to perform, the specification of a sample color or the color matching on a sample color, and the user only has to simply give an instruction by using the button.

Figure 9:
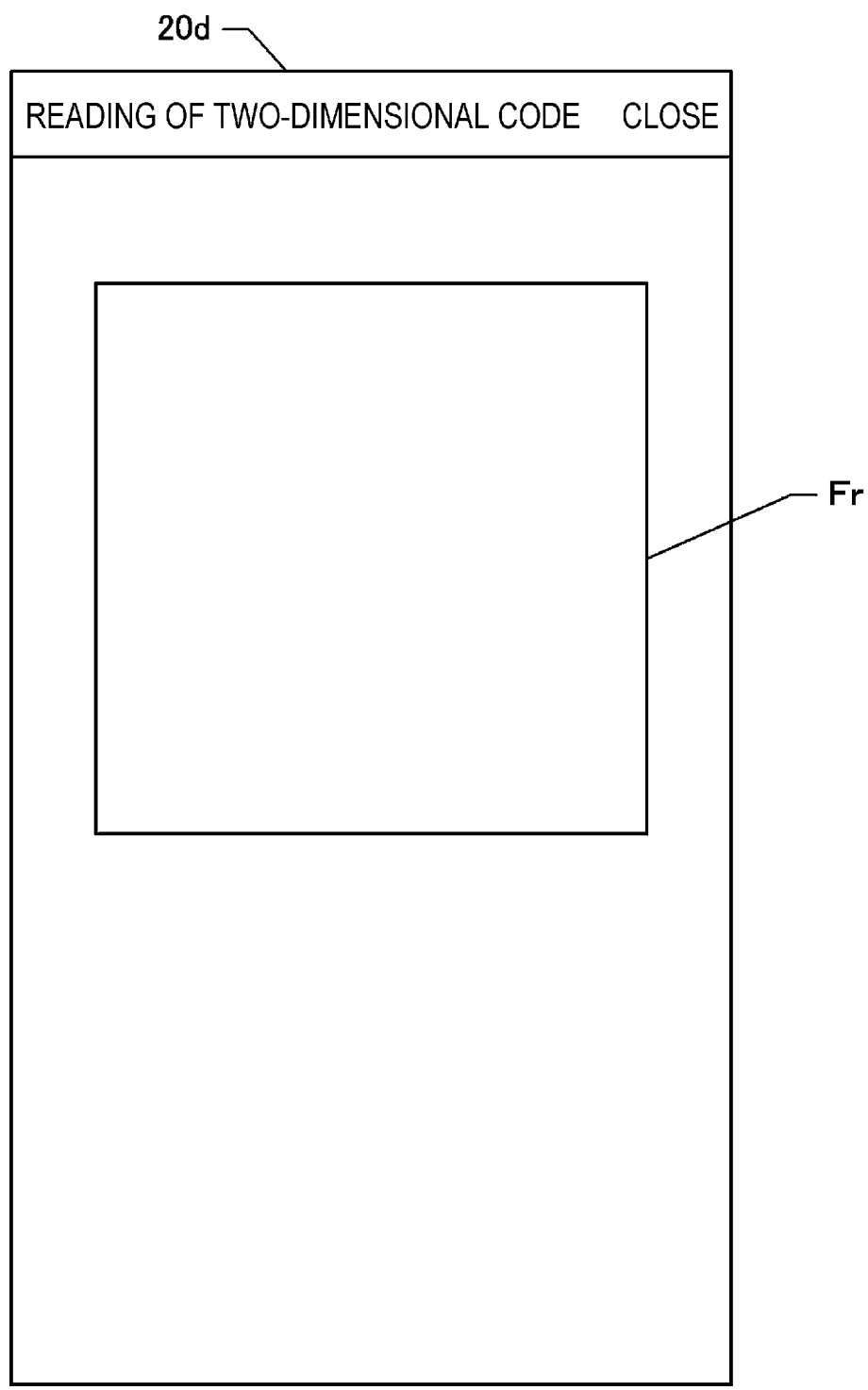
FIG. 9 is a diagram illustrating an example of a screen at the time of reading the two-dimensional code.

When the processing start instruction is given, the processor 20*a* of the information processing apparatus 20 displays a two-dimensional code reading screen by the function of the code reader 20*a*1 (step S200). The processor 20*a* outputs image data for displaying the two-dimensional code reading screen on the display 20*d* to display the two-dimensional code reading screen on the display 20*d*. In this regard, the processor 20*a* starts the camera 20*f* at this time to go into an image capturing state. FIG. 9 illustrates an example of the two-dimensional code reading screen. In the present embodiment, a frame Fr in which an image captured by the camera 20*f* is to be displayed is disposed. The processor 20*a* displays image data indicating an image captured by the camera 20*f* in the frame Fr.

In this state, the user performs reading work of the two-dimensional code displayed on the display 11*d* of the terminal 11 (step S110). Specifically, the user adjusts the position and the posture of the information processing apparatus 20 so that the two-dimensional code is displayed in the frame Fr of the display 11*d*. On the other hand, the processor 20*a* of the information processing apparatus 20 decodes the two-dimensional code by the function of the code reader 20*a*1 (step S205). That is to say, the processor 20*a* periodically analyzes the image captured by the camera 20*f*, and when there is a two-dimensional code in the image, the processor 20*a* reads the two-dimensional code, and decodes the processing information of the two-dimensional code.

When the read two-dimensional code is the first two-dimensional code Cd1, the processor 20*a* identifies that the processing type is 1, that is to say, the specification of a sample color. Also, the processor 20*a* identifies color measurement conditions. Further, the processor 20*a* identifies an ID, which is identification information, a name, and its display color for each of the sample colors to be measured.

Figure 10:
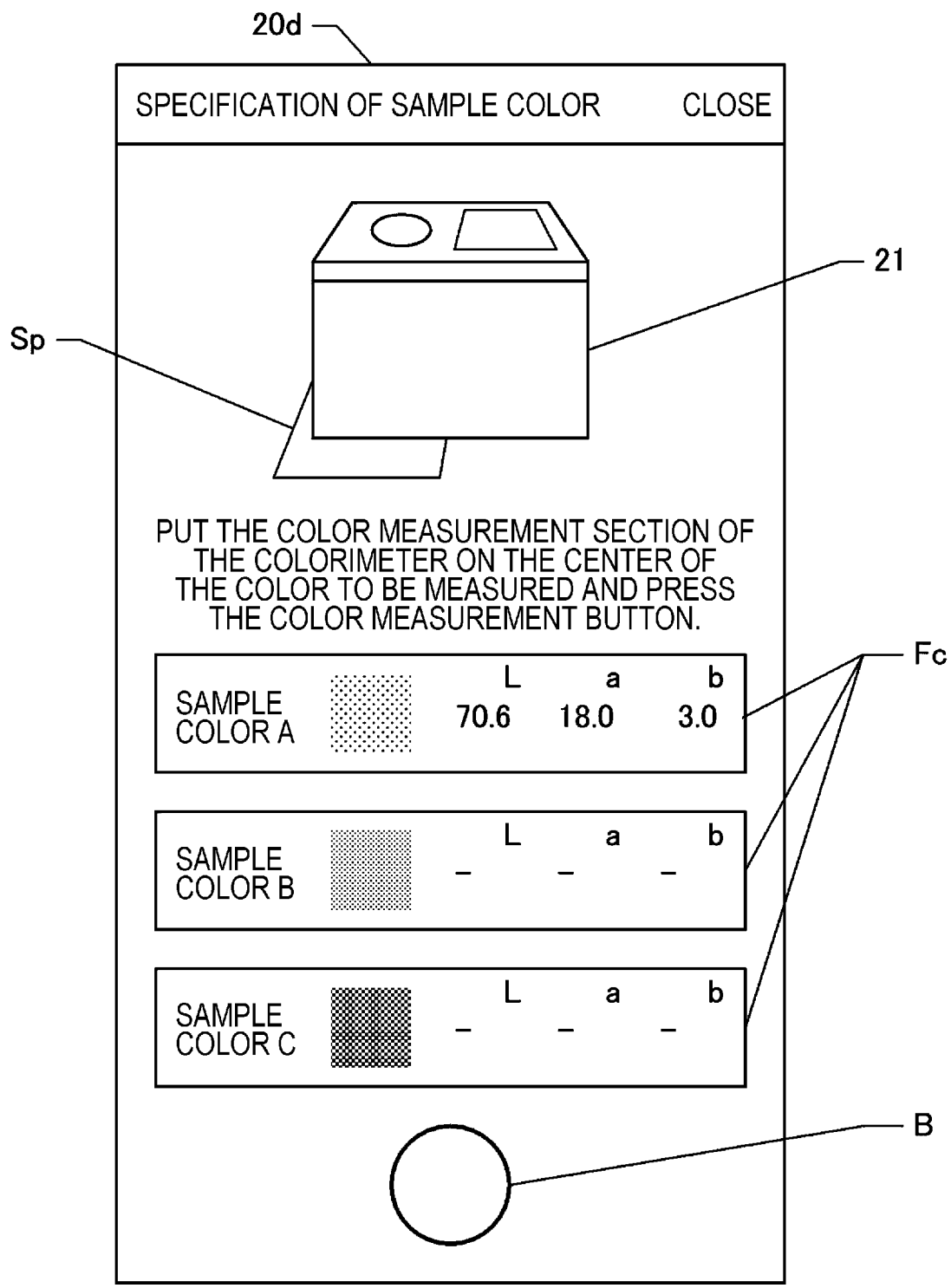
FIG. 10 is a diagram illustrating an example of a screen for specifying a sample color.

In this case, since the processing type is 1, the processor 20*a* starts the specification screen of a sample color by the functions of the selection section 20*a*2 and the screen controller 20*a*3 (step S210). That is to say, the processor 20*a* considers that the processing to be started is the processing for specifying a sample color. Further, the processor 20*a* controls the display 20*d* so as to display a screen for specifying a sample color. FIG. 10 is a diagram illustrating an example of a screen for specifying a sample color. In the screen illustrated in FIG. 10, a state in which the colorimeter 21 measures the color of a sample Sp is schematically illustrated in the upper part of the screen.

Also, on the screen illustrated in FIG. 10, a plurality of frames Fc are displayed, and information on the color of the sample color to be measured is displayed in each of the frames Fc. The information on a sample color includes a name, an icon indicating a sample color, and color measurement values. The processor 20*a* identifies a name of a sample color and the display color of an icon based on the processing information, and displays the character indicating the name and the icon expressed in the display color in each of the frames Fc. For example, in FIG. 10, the names of three sample colors are "sample color A", "sample color B", and "sample color C" in order from top to bottom. The processor 20a identifies these names based on the processing information of the first two-dimensional codes Cd1. Rectangular icons indicating individual sample colors are disposed to the right of the individual names. The processor 20a identifies the colors of these icons based on the individual display colors indicated by the processing information of the first two-dimensional codes Cd1, and displays the individual icons.

Color measurement values are Lab values as described above, and Lab values are displayed in the frame Fc when color measurement is performed. Specifically, the user operates the colorimeter 21 to press the color measurement section on the sample to measure the color of the sample (step S115). Specifically, the user operates the information processing apparatus 20 to give a color start instruction. In the example illustrated in FIG. 10, a color measurement start button B is displayed, and every time the user taps the color measurement start button B, the sample colors illustrated in the frames Fc are measured in order from top to bottom. In the present embodiment, the names of the individual sample colors are written on the samples, and thus the user performs color measurement while comparing the name on a sample with the name displayed on the display 20d and determining whether or not a color measurement target is suitable.

When the user operates the color measurement start button B, the processor 20a of the information processing apparatus 20 obtains color measurement values and displays the color measurement values on the screen (step S215). Specifically, the processor 20a of the information processing apparatus 20 transmits the color measurement conditions included in the processing information to the colorimeter 21 via the communication section 20b. When the colorimeter 21 receives the color measurement conditions, the colorimeter 21 illuminates the sample under the color measurement conditions to measure the color of the sample. When the color measurement is performed, the colorimeter 21 transmits the information indicating the Lab values, which are the color measurement values, to the information processing apparatus 20. The processor 20a obtains the Lab values as color measurement values via the communication section 20b. The processor 20a then regards the color measurement values as the color measurement values of the sample color displayed uppermost among the sample colors to be measured, that is to say, the sample colors whose color measurement values are not displayed. The processor 20a then associates an ID, which is the identification information of the sample color to be measured, and a name with the color measurement values to generate sample color information 10c1 and saves the information in the nonvolatile memory 20c.

Further, the processor 20a displays the Lab values, which are the color measurement values, on the screen by the function of the screen controller 20a3. That is to say, the processor 20a displays the Lab values of the measurement target sample color in the frame Fc indicating the sample color to be measured. FIG. 10 illustrates an example of the state in which the Lab values are displayed for the sample color A, but the colors of the sample colors B and C are not yet measured so that the Lab values thereof are not displayed.

After the color measurement is performed, the user determines whether or not all the sample colors have been measured (step S120). When all the sample colors have not been measured, the processing of step S115 and the subsequent processing are repeated. Also, the processor 20a determines whether or not all the sample colors have been measured (step S220). When all the sample colors have not been measured, the processing of step S215 and the subsequent processing are repeated. The determination of whether or not all the sample colors have been measured may be made automatically, or may be made by a user instruction. In the former case, for example, when the color measurement values of all the sample colors included in the processing information of the first two-dimensional code Cd1 have been obtained, the determination may be made that the processor 20a has measured all the sample colors, or the like. In the latter case, the user may operate the information processing apparatus 20 or the like to instruct that all the sample colors have been measured or the like.

In step S220, when determined that all the sample colors have been measured, the processor 20a transmits the color measurement values of the sample colors to the server 10 by the function of the transmission section 20a4 (step S225). That is to say, the processor 20a transmits the sample color information 10c1 generated by the color measurement to the server 10 via the communication section 20b. The processor 10a of the server 10 obtains the information via the communication section 10b and saves the color measurement values of the sample colors (step S305). That is to say, the processor 10a saves the sample color information 10c1 transmitted from the information processing apparatus 20 in the nonvolatile memory 10c.

By the above processing, the specification processing of the measurement values of the sample colors is automatically selected without explicitly giving a start instruction of the specification processing of the color measurement values of the sample colors by the user to the information processing apparatus 20. Accordingly, the specification processing of the color measurement values of the sample colors is suitably selected without performing complicated operation of the information processing apparatus 20 by the user. Also, in the present embodiment, either the specification processing of sample color values or the color matching processing on the sample colors is automatically selected. Both of the processing is the processing that involves the measurement of a color using the colorimeter 21, and thus the user is likely to be confused when selecting either one. However, in the present embodiment, the selection is automatically made based on the two-dimensional code. Accordingly, no mistakes will be made in selecting the processing.

Further, in the present embodiment, it is possible to start the processing for specifying a sample color in the information processing apparatus 20 by reading the first two-dimensional code Cd1 displayed on the display 20d. Accordingly, the user is able to specify a sample color by the simple work to cause the information processing apparatus 20 to read the first two-dimensional code Cd1.

2.2 Color Matching Processing on Sample Color

Figure 11:
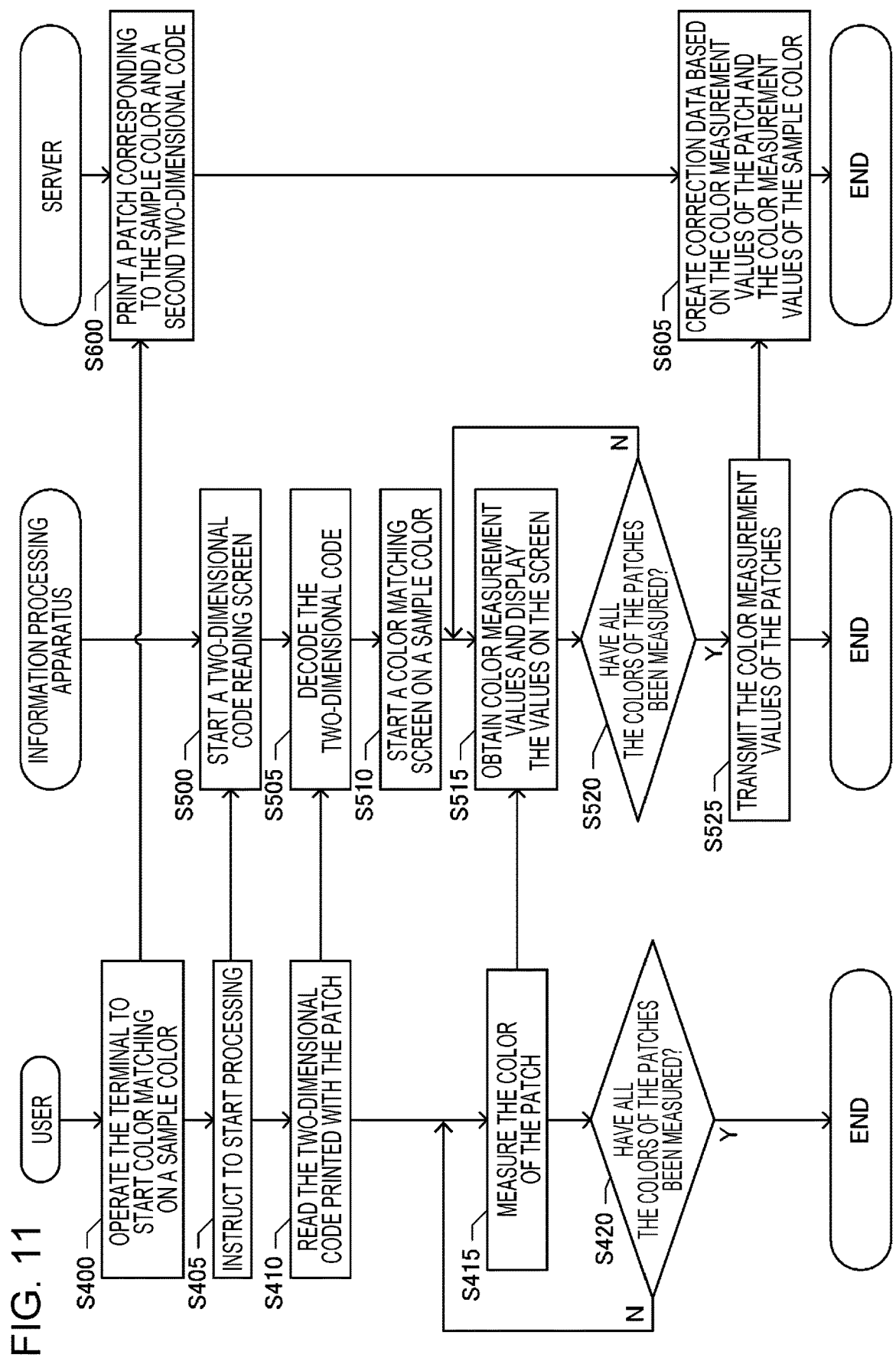
FIG. 11 is a flowchart illustrating the work and the processing regarding color matching on a sample color.

In the following, a detailed description will be given of the processing of the color matching on a sample color. The color matching on a sample color is carried out by measuring the color of a patch of a sample color printed using the printer 30 to obtain color measurement values (Lab values) and generating correction data based on the color measurement values. FIG. 11 is a flowchart of the color matching processing on a sample color. FIG. 11 illustrates the user workflow, the processing flow of the information processing apparatus 20, and the processing flow of the server 10. The user specifies a sample color by the processing illustrated in FIG. 7, and then starts the color matching work on a sample color by operating the terminal 11 (step S400). That is to say, the user operates the input section 11e of the terminal 11 to input a start instruction of the color matching work on a sample color. At this time, the user operates the input section 11e to specify a sample color, which is a color matching target. Specifically, the information indicating the sample color whose color measurement values are specified is already stored in the nonvolatile memory 10c as the sample color information 10c1. The user then selects a sample color to be measured from the sample colors saved as the sample color information 10c1. When there are a plurality of sample colors to be measured, the user selects the plurality of sample colors. When a sample color is selected, the processor 10a of the server 10 refers to the sample color information 10cl and identifies the identification information of the selected sample color.

When the identification information of a sample color to be a color matching target is identified, the processor 10a of the server 10 causes the printer 30 to print a patch corresponding to the sample color and a second two-dimensional code indicating the color matching on the sample color (step S600). Specifically, the processor 10a refers to the information 10cl of the sample color to be the target of the color matching and identifies the specified color measurement values (Lab values). Further, the processor 10a identifies the display color of the sample color to be the target of the color matching. The display color may be determined by various methods and, for example, it is possible to employ the configuration in which the display color is determined from the color measurement values indicated by the sample color information 10c1 or the like.

Further, the processor 10a generates a second two-dimensional code including the processing information indicating a display color, color measurement conditions, and a processing type 2. The processor 10a then transmits the second two-dimensional code, a patch corresponding to the sample color, and print data for printing to the printer 30 via the communication section 10b. The print data for printing the patch corresponding to the sample color may have various modes, for example, the print data has a predetermined size and shape and the color whose Lab values are identical to the sample color. The printer 30 converts the print data based on a color profile and prints the patch. At this stage, correction data 10c3 for the sample color has not been generated, and thus the printer 30 performs printing without referring to the correction data 10c3. When there are a plurality of sample colors to be the color matching targets, a plurality of patches associated with the corresponding sample colors are printed. The server 10 the saves the identification information of the sample color in the nonvolatile memory 10c in association with the patches. In this regard, the identification information is transmitted to the information processing apparatus 20. The processor 20a of the information processing apparatus 20 obtains the identification information and saves the information in the nonvolatile memory 20c or the like.

Figure 12:
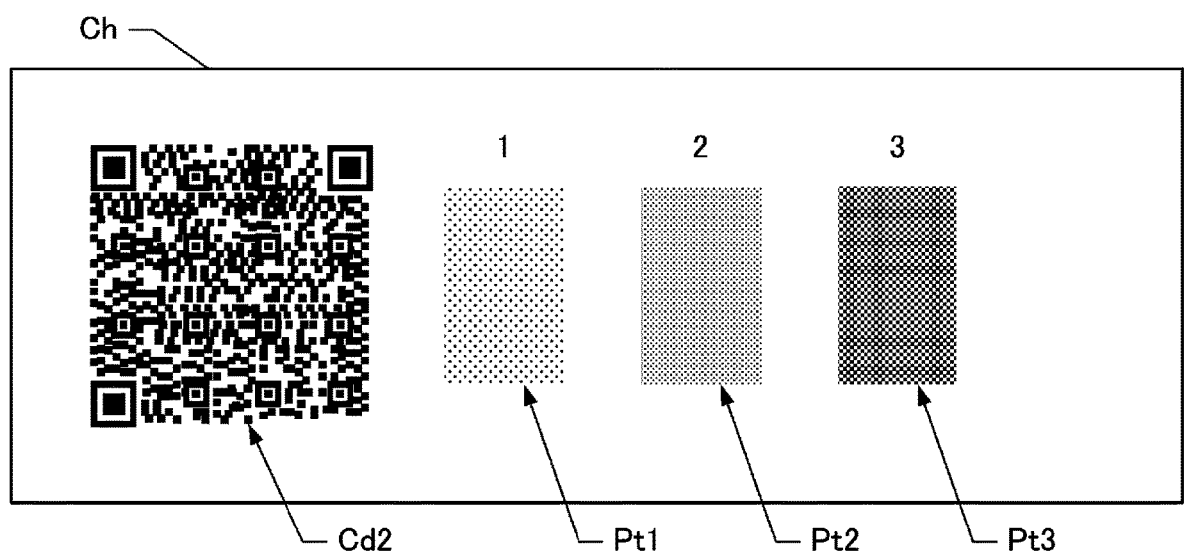
FIG. 12 is a diagram illustrating a print example of a second two-dimensional code.

FIG. 12 illustrates an example of a chart Ch on which a second two-dimensional code Cd2 and patches Pt1 to Pt3 are printed. In the example illustrated in FIG. 12, the second two-dimensional code Cd2 is printed on the left of the chart Ch, and the patches Pt1 to Pt3 for three colors are printed to the right of the second two-dimensional code Cd2. Further, in the example illustrated in FIG. 12, each of the patches Pt1 to Pt3 is associated with a number. The colors of these patches Pt1 to Pt3 are correctly specified by respective color measurement values. However, by a color reproduction error due to a change over the years of the printer 30, the color profiles, and the like, the patches Pt1 to Pt3 usually do not match the respective color measurement values. Accordingly, the processing for creating correction data 10c3 such that the colors of these patches Pt1 to Pt3 become closer to the individual color measurement values is the color matching processing.

When the chart Ch including the second two-dimensional code Cd2 and the patches Pt1 to Pt3 are printed, the user gives a processing start instruction using the information processing apparatus 20 (step S405). When the processing start instruction is given, the processor 20a of the information processing apparatus 20 displays a two-dimensional code reading screen by the function performed by the code reader 20a1 (step S500). The two-dimensional code reading screen is a screen illustrated in FIG. 9. In this state, the user performs reading operation of the printed two-dimensional code with the patches (step S410). On the other hand, the processor 20a of the information processing apparatus 20 decodes the two-dimensional code by the function performed by the code reader 20a1 (step S505). In this regard, the processing in step S405, S410, S500, and S505 are the same as that in step S105, S110, S200, and S205 illustrated in FIG. 7, respectively except that the read target is not the first two-dimensional code Cd1 but the second two-dimensional code Cd2.

When the two-dimensional code read in step S505 is the second two-dimensional code Cd2, the processor 20a identifies that the processing type is 2, that is to say, the color matching on a sample color. Also, the processor 20a identifies color measurement conditions. Further, the processor 20a identifies display colors for the individual sample colors to be measured.

Figure 13:
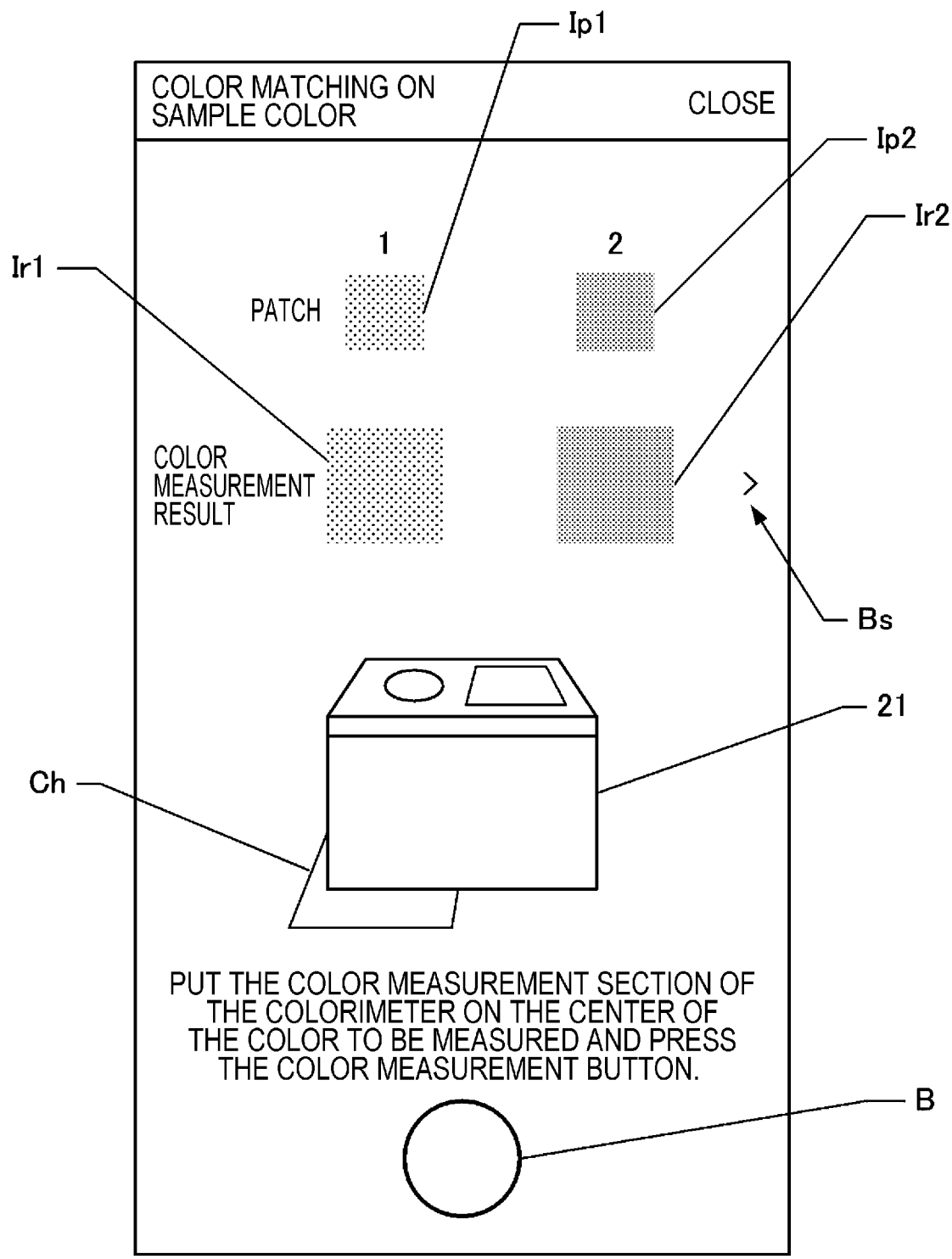
FIG. 13 is a diagram illustrating an example of a screen for color matching on a sample color.

In this case, since the processing type is 2, the processor 20a starts the color matching screen on the sample color by the functions of the selection section 20a2 and the screen controller 20a3 (step S510). That is to say, the processor 20a regards the processing to be started as the processing for performing the color matching on a sample color. Further, the processor 20a controls the display 20d so as to display a screen for performing the color matching on the sample color. FIG. 13 is a diagram illustrating the example of a screen for performing the color matching on the sample color. On the screen illustrated in FIG. 13, icons Ip1 and Ip2 indicating the respective patches to be color measured and icons Ir1 and Ir2 indicating the respective color measurement results are displayed in the upper part of the screen. When there are a plurality of patches to be color measured, the patches are arranged horizontally side by side. On the screen illustrated in FIG. 13, two types of patches are displayed, and thus when three or more types of patches are to be measured, it is possible to scroll the screen by using a scroll button Bs, and thus to display the other subsequent patches.

The patches are displayed in the individual display colors, and the icons Ir1 and Ir2 indicating the respective color measurement results are displayed in the respective colors determined based on the respective color measurement values. Before the colors of the of patches are measured, the icons Ir1 and Ir2 indicating the respective color measurement results are not colored. Also, in the center of the screen exemplified in FIG. 13, the state in which the colorimeter 21 measures the color of a chart Ch is schematically illustrated.

In a state in which such a screen is displayed, the user measures the colors of the respective patches in sequence. First, the user operates the colorimeter 21 to press the color measurement section on a patch and measures the color of the patch (step S415). Specifically, the user operates the information processing apparatus 20 to give a color measurement start instruction. In the example illustrated in FIG. 13, a color measurement start button B is displayed. Every time the color measurement start button B is tapped, the color of the corresponding patch printed as the chart Ch is measured from left to right. In the present embodiment, each patch has a printed number associated with the patch, and thus the user compares the number on the chart Ch with the number displayed on the display 20d for each patch to perform color measurement while determining whether or not a color measurement target is suitable.

When the user operates the color measurement start button B, the processor 20a of the information processing apparatus 20 obtains color measurement values and displays the values on the screen (step S515). Specifically, the processor 20a of the information processing apparatus 20 transmits the color measurement conditions included in the processing information to the colorimeter 21 via the communication section 20b. When the colorimeter 21 receives the color measurement conditions, the colors of the respective patches are illuminated by the color measurement conditions and measured. When the color measurement is performed, the colorimeter 21 transmits the information on the Lab values, which are color measurement values, to the information processing apparatus 20. The processor 20a obtains the Lab values via the communication section 20b as color measurement values. The processor 20a then regards the color measurement values as the color measurement values of the patch to be measured.

In this regard, in the present embodiment, a color measurement target patch is identified based on a number attached to the patch. For example, in the example illustrated in FIG. 12, it is assumed that the patches are selected as a measurement target in sequence from left to right (in numerical order). First, when color measurement values are obtained, the color measurement target is regarded as the leftmost (number 1) patch. When color measurement values are obtained second, the color measurement target is regarded as the center (number 2) patch. The processor 20a identifies a measured patch by the order of the patch measurement, and associates identification information corresponding to the patch with color measurement values to generate patch information 10c2, and saves the information in the nonvolatile memory 20c. Further, the processor 20a displays an icon indicating the color measurement result in association with the color measurement target patch by the function of the screen controller 20a3. For example, in the example illustrated in FIG. 13, in the stage before the color of the patch indicated by the icon Ip1 is measured, the icon Ir1 indicating a color measurement result is not displayed. When the color of the patch indicated by the icon Ip1 is measured, the icon Ir1 indicating the color result is displayed.

When the color measurement is performed, the user determines whether or not all the sample colors have been measured (step S420). When all the sample colors have not been measured, the processing of step S415 and the subsequent processing are repeated. Also, the processor 20a determines whether or not all the sample colors have been measured (step S520). When all the sample colors have not been measured, the processing of step S515 and the subsequent processing are repeated. The determination of whether or not all the sample colors have been measured may be made automatically, or by an instruction by the user. In the former case, for example, when the color measurement values are obtained for the same number of patches as the number of the sample colors that are targeted for the color matching, the processor 20a may determine that all the samples have been measured. In the latter case, the user may operate the information processing apparatus 20 or the like to instruct that all the sample colors have been measured or the like.

In step S520, when it is determined that the colors of all the samples have been measured, the processor 20a transmits the color measurement values of the patches to the server 10 by the function of the transmission section 20a4 (step S525). That is to say, the processor 20a transmits the patch information 10c2 created by the color measurement to the server 10 via the communication section 20b. The processor 10a of the server 10 obtains the information via the communication section 10b, and creates correction data 10c3 based on the color measurement values of the patch and the color measurement values of the sample color (step S605). Specifically, the processor 10a saves the patch information 10c2 transmitted from the information processing apparatus 20 in the nonvolatile memory 10c.

Further, the processor 10a refers to the patch information 10c2 and the sample color information 10c1, and obtains the color measurement values of the patch and the color measurement values of the sample color that are associated with each other by the same identification information. The color measurement values of the sample color are values that correctly indicate the sample color. However, when the printer 30 performs printing using the color measurement values of the sample color without making corrections, the printing is performed by using the color measurement values of the patch. In this case, a difference occurs corresponding to the color difference between the color measurement values of the sample color and the color measurement values of the patch. The processor 10a thus creates correction data 10c3 for eliminating the difference to make the color difference as close to zero as possible. It is possible to create the correction data 10c3 using one of the various publicly known methods.

With the processing described above, the color matching processing on the sample color is automatically selected even when the user does not explicitly give a start instruction of the color matching processing on the sample color to the information processing apparatus 20. Accordingly, the color matching processing on the sample color is suitably selected without performing complicated operation of the information processing apparatus 20 by the user. Also, in the present embodiment, either the processing for specifying the color measurement value on a sample color or the processing for color matching on a sample color is automatically selected. Both of the processing involve color measurement using the colorimeter 21. Accordingly, it is confusing for the user to select which processing to perform. In the present embodiment, the processing is automatically selected based on the two-dimensional code. Accordingly, the user will not make a mistake in performing the processing.

Further, in the present embodiment, by reading the printed second two-dimensional code Cd2, it is possible to start the processing of the color matching on a sample color in the information processing apparatus 20. Accordingly, it is possible for the user to perform the color matching on a sample color by a simple work which causes the information processing apparatus 20 to read the second two-dimensional code Cd2.

3. Other Embodiments

The embodiment described above is an example for carrying out the present disclosure. It is possible to employ various other embodiments. For example, in the embodiment described above, the server 10 and the terminal 11 are separate devices. However, both of the devices may be installed in the same device, or may be distributed among three devices or more. At least a part of the processing, which is illustrated in FIG. 7 and FIG. 11, performed by the information processing apparatus 20 may be performed by the server 10. Also, at least a part of the processing performed by the server 10 may be performed by the information processing apparatus 20. Further, in the above-described embodiment, the first two-dimensional code is displayed on the display 11d, and the second two-dimensional code is printed. However, the first two-dimensional code may be printed, and the second two-dimensional code may be displayed. Alternatively, both of the codes may be displayed, or may be printed.

Further, the modes of providing various kinds of information may be various. For example, the information included in the processing information illustrated in FIG. 6 is an example, and the information may have the other modes. As an example of the other modes, the identification information of a sample color and the information regarding the display color may not be included in the first two-dimensional code, and these kinds of information may be transmitted from the server 10 to the information processing apparatus 20. Also, the second two-dimensional code may include the identification information of a sample color.

Further, the information included in the processing information may be various kinds of information. For example, for the information for identifying a sample color, the number of sample colors to be measured may be defined and may be included in the first two-dimensional code. With this configuration, the number of sample colors to be measured becomes clear, and thus it is possible for the information processing apparatus 20 to perform color measurement processing for the number of sample colors to be measured.

Further, the information indicating a color matching target may be included in the second two-dimensional code. That is to say, a sample color is often scheduled to be used for printing specific print data. Accordingly, the color matching may be performed in a state in which print data that is the color matching target of a sample color is identified.

That is to say, before the printer performs printing based on the print data specified by a user, the printer prints a patch in order to perform color matching on a sample color included in the print data, and the color matching is performed by measuring the color of the patch. In this case, the processor 10a may generate a second two-dimensional code including the identification information for identifying the print data, and may print the code with a patch. The identification information for identifying print data may be defined in various modes, and, for example, an ID, a file name, or the like may be the identification information. The information processing apparatus 20 reads the second two-dimensional code to obtain the identification information, and the identification information of the print data is associated with the patch information 10c2 obtained by measuring the color of the patch.

The processor 10a of the server 10 generates correction data 10c3 based on the patch information 10c2, and associates the correction data 10c3 with the identification information of the print data. When printing is performed based on the print data, the processor 10a refers to the correction data 10c3 and selects the correction data 10c3 associated with the identification information of the print data. The processor 10a then transmits the selected correction data 10c3 and the print data to the printer 30. When the processor 30a of the printer 31 performs printing based on the print data, the processor 30a corrects the sample color by referring to the correction data 10c3 associated with the identification information of the print data, and performs printing. With this configuration, it becomes possible to automatically select the correction data 10c3 when printing the print data.

The code reader only has to read a two-dimensional code including the processing information indicating the processing regarding a sample color. That is to say, the code reader only has to obtain a two-dimensional code and decode the processing information. A sample color is a color determined to be a specific color and is also referred to as a special color or a specified color. A sample color may be defined in various modes, may be identified by a sample, or may be identified by values in a machine independent color space, such as Lab values or the like.

There may be a plurality of kinds of processing regarding a sample color, and various kinds of processing other than the processing in the embodiment described above may be assumed. For example, the processing regarding a sample color may include specification and creation of a color profile for outputting a sample color by the printer, or the processing of correction or the like. Also, the processing regarding a sample color may include deletion of the color measurement values of a sample color, modification or correction of a color matching result, or the like. In any case, the processing should be selected based on the processing information obtained by reading a two-dimensional code.

The processing information is used at least for selecting the processing regarding a sample color. However, the processing information may include information other than the selection of the processing regarding a sample color. For example, the information used by the selected processing or the like may be included. The two-dimensional code only has to include processing information, and the type of the two-dimensional code and standard are not limited.

The selection section may only select the first processing or the second processing regarding a sample color based on the processing information. That is to say, the selection section may only select the processing regarding a sample color based on the processing information. As described above, there may be various kinds of processing among the processing regarding a sample color. Accordingly, the processing may be selected from three or more kinds of processing.

The screen controller may only display the first screen on which information regarding the first processing is displayed or the second screen on which information regarding the second processing is displayed in accordance with a result selected by the selection section. That is to say, the screen controller may only perform display control so as to display a screen corresponding to the selected processing on the display section. The first screen and the second screen only have to be different with each other. The first screen may only be a screen for displaying information regarding the first processing, and the second screen may only be a screen for displaying information regarding the second processing. The first screen and the second screen may be screens that are displayed on the entire display section or screens that are displayed on a part of the display section.

Further, it is possible to apply the present disclosure as a program performed by a computer or a method. Also, the above-described system, program, and method may be realized as a single device, or realized by using a part included in a plurality of devices, and may include various modes. Also, it is possible to suitably change a part of the disclosure, for example, a part may be software and another part may be hardware, and the like. Further, the disclosure may be realized as a recording medium of a program controlling a system. Of course, the program recording medium may be considered to be a magnetic recording medium, a semiconductor memory, or any recording medium to be developed in the future in the same manner.

Also, the embodiments described above will not restrict the disclosure. The embodiments include a plurality of disclosures having different advantages. Accordingly, one problem or advantage derived from the embodiments is not necessary a problem or an advantage of all the disclosures included in the embodiments.

What is claimed is:

1. An information processing apparatus comprising:
a processor configured to:
    read a two-dimensional code including processing information indicating processing regarding a sample color;
    select first processing or second processing regarding the sample color based on the processing information, wherein
        the first processing is processing for specifying color measurement values of the sample color, and
        the second processing is processing for performing color matching on the sample color to be printed by a printer; and
    display a first screen for displaying information regarding the first processing or a second screen for displaying information regarding the second processing in accordance with a result of the selection of the first processing or the second processing.

2. The information processing apparatus according to claim 1, wherein
the processing for specifying the color measurement values of the sample color is processing for measuring a sample of the sample color provided in advance and specifying the color measurement values of the sample color, and
the processing for performing the color matching is processing for measuring a color of a patch of the sample color printed using the printer and obtaining the color measurement values.

3. The information processing apparatus according to claim 1, wherein
a first two-dimensional code including the processing information for selecting the first processing is displayed on a display device by a display instruction from a server including a storage medium storing the color measurement values of the sample color, and
the processor is further configured to read the first two-dimensional code displayed on the display device.

4. The information processing apparatus according to claim 3, wherein
the first two-dimensional code includes at least one of a number of sample colors to be measured and identification information, and
the sample colors include the sample color.

5. The information processing apparatus according to claim 1, wherein
a second two-dimensional code including the processing information for selecting the second processing is printed with a patch of a color to be measured by the printer printing the sample color, and the processor is further configured to read the second two-dimensional code printed by the printer.

6. The information processing apparatus according to claim 5, wherein
the second two-dimensional code includes information indicating the patch.

7. The information processing apparatus according to claim 5, wherein
the printer prints the patch for performing the color matching on the sample color included in print data before printing based on the print data instructed by a user, and
the second two-dimensional code includes identification information for identifying the print data.

8. An information processing method comprising:
reading a two-dimensional code including processing information indicating processing regarding a sample color;
selecting first processing or second processing regarding the sample color based on the processing information, wherein
    the first processing is processing for specifying color measurement values of the sample color, and
    the second processing is processing for performing color matching on the sample color to be printed by a printer; and
displaying a first screen for displaying information regarding the first processing or a second screen for displaying information regarding the second processing in accordance with a result of the selection of the first processing or the second processing.

9. An information processing system comprising a server and an information processing apparatus,
the information processing apparatus including a processor configured to:
    read a first two-dimensional code displayed on a display device by a first instruction from the server or a second two-dimensional code printed using a printer by a second instruction from the server, the first two-dimensional code or the second two-dimensional code including processing information indicating processing regarding a sample color;
    select first processing or second processing regarding the sample color based on the processing information, wherein
        the first processing is processing for specifying color measurement values of the sample color, and
        the second processing is processing for performing color matching on the sample color to be printed by the printer;
    display a first screen for displaying information regarding the first processing or a second screen for displaying information regarding the second processing in accordance with a result of the selection of the first processing or the second processing; and
    transmit information obtained by the first processing or the second processing to the server,
the server including a storage medium for storing the information obtained by the first processing or the second processing.

* * * * *